United States Patent Office 3,123,933
Patented Mar. 10, 1964

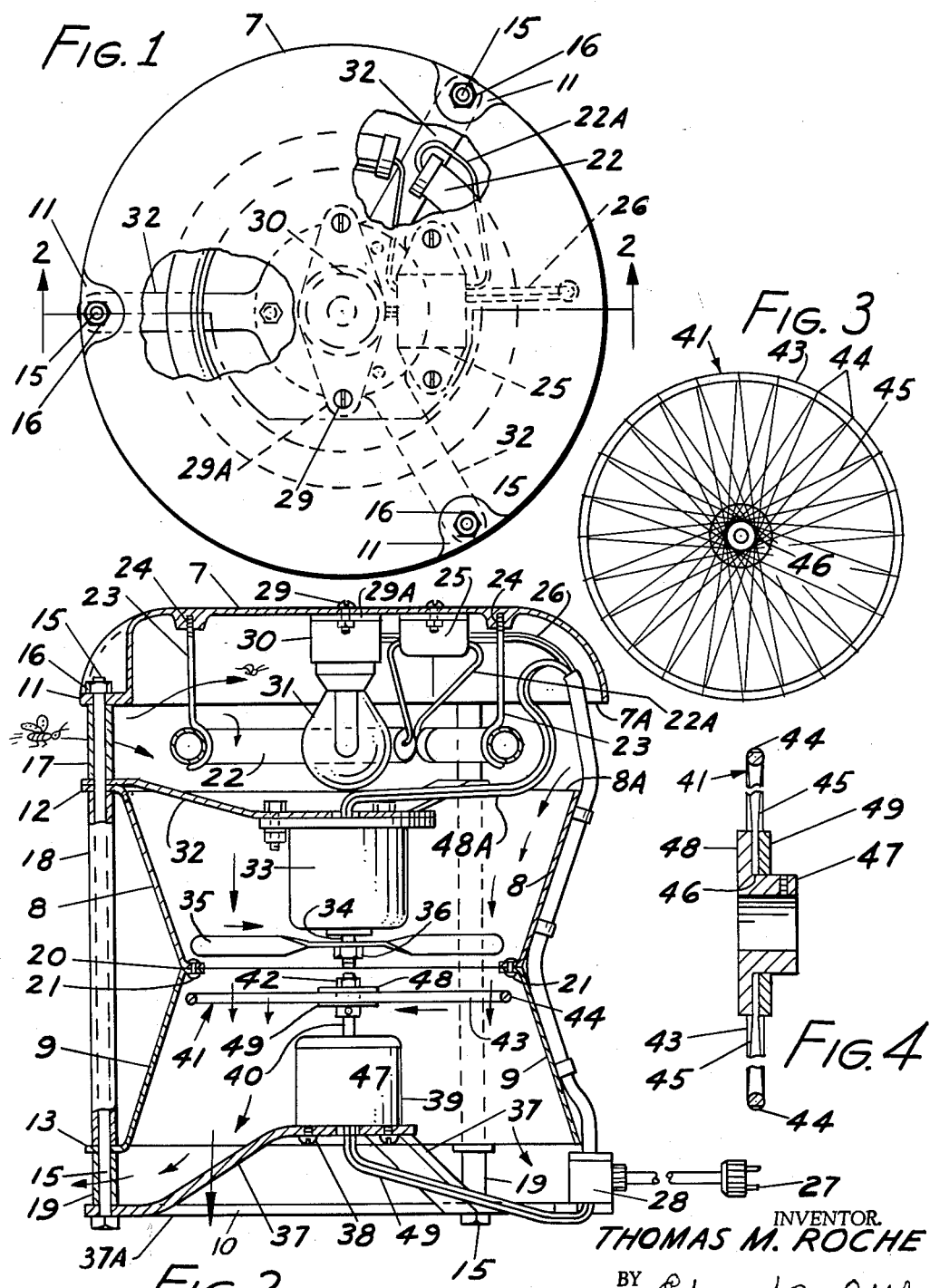

3,123,933
INSECT ERADICATOR
Thomas M. Roche, 116 N. Hamilton, Ypsilanti, Mich.
Filed June 11, 1962, Ser. No. 201,467
2 Claims. (Cl. 43—139)

This invention relates to insect controls and has particular reference to a device for attracting and exterminating insects, such as flies, mosquitos, moths and the like.

An object of the invention is to provide a device of the character indicated, which is constructed with at least two lights which emit rays of different spectrum characteristics, whereby a variety of different insects may be attracted.

Another object of the invention is to provide a device of the character indicated, which is constructed with at least two light sources, producing light rays of different wave lengths for attracting a wide variety of insects, together with air impelling means that force the insects onto means that completely disintegrate the insects.

Another object of the invention is to provide a device of the character indicated, which is sanitary and inoffensive to human sight and smell, and overcomes the objectionable features of presently known electrical exterminators which electrocute the insects, but leave their bodies and wings intact to accumulate in unsightly and foul smelling masses, in and about the device.

I am aware of the fact that others have disclosed devices with lighting effects for attracting the insects, but such devices leave much to be desired. None of the devices now known to the public employ a lighting combination and effect such as herein disclosed.

This lighting effect is achieved by the use of a fluorescent "Circleline" black light tube mounted in a horizontal position and being visible from 360 degrees around the horizon. Mounted in the center of said "Circleline" tube is a yellow incandescent lamp.

Since insects as a whole have very poor eyesight and since many of the hundred of different varieties may be able to see and be atracted by one color, or kind, or combination of light, they may be totally blind to another light that appears to the human eye to be of equal brilliance, intensity, or value. Apparently the yellow light showing through and around the black light (which appears an intense deep blue to the human eye) has a tendency to alter the light values to cover the color spectrum from deep blue, through the various shades of green to yellow, thus enabling far more insects to be attracted and destroyed than could be accomplished through the use of a single light or a light or lights facing in one direction only.

A further object of the invention is to provide a device which includes a contra-rotating multi-wire spoke, power driven eradicator wheel, which faces the fan and rotates at fan speed or greater, but in the opposite direction. Since the flow of air carrying the insects through the fan will be spiraling somewhat in the direction of the fan's rotation, the air flow causes the insects to be thrown against the oppositely moving wheel spokes at high speed, thereby killing and disintegrating the insects instantly, and permitting the disintegrated insects to readily pass on through the wheel and drop to the ground. This eliminates the necessity of screens, filters or other collection receptacles, and obviates the necessity of the constant attention and the cleaning that such structures require.

The foregoing and other objects and the advantages of the invention will become more apparent as the description proceeds, reference being made from time to time to the accompanying drawing, forming part of the within disclosure in which drawing:

FIG. 1 is a top plan view, with parts broken away, of a device embodying the invention.

FIG. 2 is a vertical section taken substantially on the line 2—2 of FIG. 1.

FIG. 3 is a plan view of the insect eradicator wheel.

FIG. 4 is a sectional view of the wheel shown in FIG. 3.

Referring now more particularly to the drawings, it will be understood that in the embodiment herein disclosed, the reference character 7 indicates the top, the reference characters 8 and 9 indicate the side walls, and the reference character 10 indicates the bottom of the housing in which the working parts of the device are enclosed. The members 7, 8 and 9 are flanged, as at 11, 12 and 13, which flanges are provided with openings through which are extended tie rods 15, which are headed at the bottom and are provided with nuts 16 at the top. Tubular spacers 17, 18 and 19 maintain the housing elements in their proper positions. The members 8 and 9 are also flanged, as at 20, which flanges 20 are provided with bores therein, which bores are arranged to receive rivets 21, whereby the members 8 and 9 are further secured to one another.

It will be noted that the lower edge 7A of the top 7 is spaced from the upper edge 8A of the member 8. This opening continues 360 degrees around the housing and serves as the air intake for the device as shown by the arrows in FIG. 2. Positioned in the air intake opening just described is a "Circleline" black light fluorescent tube 22 which lies in a horizontal plane midway between the lower edge 7A of the top 7 and the upper edge 8A of the member 8. The tube 22 is supported by a plurality of threaded hook members 23 which are received in threaded lobes 24 formed in the top member 7. The tube 22 is connected through leads 22A to a suitable ballast 25 and hence to electrical conduits 26, which, in turn, are connected to a power source 27 through a terminal box 28. Secured to the top 7 by any suitable means 29 is a flange 29A carrying a socket 30, in which is carried a yellow bulb 31, which is substantially centered on the inside of the tube 22. The socket 30 is also connected through suitable electrical leads to the terminal box 28 and the power source 27. The lights 22 and 31 are lighted simultaneously and are visible 360 degrees around the outside of the housing. The purpose of the black light 22 and the yellow light 31 is to attract insects of different species from a great distance to the interior of the housing.

Depending from a three-legged bracket 32 is a motor 33 on the drive shaft 34 of which is mounted a fan 35. The fan is secured in position by means of a nut 36. This fan is intended to draw air into the housing through the opening previously described and force the air downwardly in the direction indicated by the arrows, carrying in the air stream any insects which are attracted to the interior of the housing by the lights 22 and 31. The outer ends of the bracket 32 have openings therein through which the tie rods 15 extend and the legs of the bracket 32 rest on top of the flanges 12 of the member 8. A similar three-legged bracket 37 extends to the annular base 37A, which in turn supports the terminal box 28, and has apertures which also receive the tie rods 15, as shown in FIG. 2.

Mounted on the bracket 37 by means of screws 38 or other suitable means is a second motor 39 to the drive shaft 40 of which is mounted an insect eradicator wheel 41 (FIGS. 2, 3 and 4). The wheel 41 is secured to the drive shaft 40 by means of a nut 42. The wheel 41 rotates preferably at a speed greater than the rotation of the fan 35 and in a direction opposite to the direction of rotation of the fan 35. The wheel 41 preferably consists of a heavy wire rim 43 which is notched, as at 44, at spaced intervals, into which notches 44 is wound a continuous length of thin piano wire 45, in the manner shown in FIG. 3. The ends of the wire are soldered or otherwise secured in place. The wire 45 is wound on the rim 43 so that a central opening 46 is formed, through which opening a hub 47 (FIG. 4) is extended. The wire 45 forming the spokes of the wheel engage the periphery of the hub 47 tangentially, which tangential contact of the wire with the hub 47 supports the wheel on the shaft 40. The hub 47 has a flange 48 on one side and a retaining washer 49 at the other side of the wheel. The retaining washer 49 is secured in position by a generous amount of rubber cement, which cement fills the spaces between the wires in the area immediately surrounding the hub and firmly cements the entire assembly into a single unit for rotation with the shaft 40.

The motors 33 and 39 are connected through suitable leads 48A and 49 to the terminal box 28 and the power source 27.

In operation, the insects of different species are attracted from a great distance by one or the other light source 22 or 31 or both and fly to the interior of the housing, where they are engulfed by and forced downwardly by means of the air impelled by the fan 35. The air impelled by the fan 35 carries with it the insects which are then thrown into the contra-rotating wheel 41 where they are killed and disintegrated. The insect debris from the wheel 41 falls to the ground through the bottom of the housing or forced out through the outlet in the housing, as shown by the arrows in FIG. 2. Because of the rotation of the fan 35 and the wheel 41 in opposite directions, the air flow carrying the insects will strike the wheel 41 with a spiraling effect, therefore greatly increasing the killing effectiveness of the wheel 41.

It is believed that the operation of the device is obvious from the foregoing description.

Having described my invention, what I claim and desire to secure by Letters Patent is:

1. A device of the character described, comprising a housing having an intake opening near the top and encompassing 360° of said housing and a discharge opening at the bottom, a circular black light tube having a yellow incandescent light axially positioned therein, visible throughout said first named opening, an air impeller below said light tube and light, means to drive said impeller, an eradicator wheel closely spaced below and concentric with said impeller and means to rotate said wheel, said housing consisting of an overhanging top and a pair of hollow frusto-conical side members, having flange members at the smaller ends thereof, said side members being secured together through said flange members, to form a restricted area in said housing between said impeller and said wheel, the said top being spaced from said side members to form said intake opening.

2. A device of the character described, comprising a housing having an intake opening near the top and encompassing 360° of said housing and a discharge opening at the bottom, a circular black light tube having a yellow incandescent light axially positioned therein, visible throughout said first named opening, an air impeller below said light tube and light, means to drive said impeller, an eradicator wheel closely spaced below and concentric with said impeller and means to rotate said wheel, said housing consisting of an overhanging top and a pair of hollow frusto-conical side members, having flange members at the ends thereof, said side members being secured together along their smallest diameter by certain of said flange members, which form a restricted area in said housing between said impeller and said wheel, the said top being spaced from said side members to form said intake opening, and elements which engage certain other of said flanged members, for supporting said driving means in said housing.

References Cited in the file of this patent

UNITED STATES PATENTS

| | | |
|---|---|---|
| 303,503 | Gallup | Aug. 12, 1884 |
| 347,845 | Valentine | Aug. 24, 1886 |
| 1,432,191 | Lachman | Oct. 17, 1922 |
| 2,282,693 | Abadie | May 12, 1942 |
| 2,340,944 | Easter | Feb. 8, 1944 |
| 2,778,150 | Pohlman | Jan. 22, 1957 |
| 2,931,127 | Mayo | Apr. 5, 1960 |
| 3,041,773 | Gagliano | July 3, 1962 |

FOREIGN PATENTS

| | | |
|---|---|---|
| 1,019,285 | France | Oct. 29, 1952 |
| 498,411 | Italy | Sept. 30, 1954 |